United States Patent
Thörn et al.

(10) Patent No.: US 11,820,400 B2
(45) Date of Patent: Nov. 21, 2023

(54) MONITORING VEHICLE MOVEMENT FOR TRAFFIC RISK MITIGATION

(71) Applicants: SONY CORPORATION, Tokyo (JP); SONY EUROPE B.V., Weybridge (GB)

(72) Inventors: Ola Thörn, Limhamn (SE); Peter Exner, Malmö (SE); Shaun Lee, Winchester (GB)

(73) Assignee: Sony Corporation, Tokyo (JP)

(*) Notice: Subject to any disclaimer, the term of this patent is extended or adjusted under 35 U.S.C. 154(b) by 362 days.

(21) Appl. No.: 16/846,738

(22) Filed: Apr. 13, 2020

(65) Prior Publication Data
US 2020/0377120 A1    Dec. 3, 2020

(30) Foreign Application Priority Data
Jun. 3, 2019 (SE) .................................. 1950651-8

(51) Int. Cl.
*B60W 60/00* (2020.01)
*B64C 39/02* (2023.01)
(Continued)

(52) U.S. Cl.
CPC ....... *B60W 60/0011* (2020.02); *B64C 39/024* (2013.01); *G06V 20/56* (2022.01); *B64U 2101/00* (2023.01)

(58) Field of Classification Search
CPC ............. B64C 2201/12; B64C 39/024; B60W 60/0011
See application file for complete search history.

(56) References Cited

U.S. PATENT DOCUMENTS 5,983,161 A   11/1999 Lemelson
2012/0025965 A1* 2/2012 Mochizuki ............. B60Q 9/008
                                                      340/435

(Continued)

FOREIGN PATENT DOCUMENTS

CN   103413444 A   11/2013
CN   108230617 A    6/2018

(Continued)

OTHER PUBLICATIONS

European Search Report for corresponding European Application No. 20166571, dated Oct. 23, 2020, 2 pages.

(Continued)

*Primary Examiner* — Khoi H Tran
*Assistant Examiner* — Tristan J Greiner
(74) *Attorney, Agent, or Firm* — Tucker Ellis LLP

(57) ABSTRACT

A monitoring system detects and mitigates traffic risks among a group of vehicles. The group of vehicles includes a ground-based vehicle (GBV), e.g. an automotive vehicle, and an air-based vehicle (ABV), e.g. a drone, which is operated to track a ground-based object (GBO), e.g. an unprotected road user or an animal. The monitoring system performs a method comprising: obtaining (301) predicted navigation data for the ground-based vehicle and the air-based vehicle, processing (302) the predicted navigation data to obtain one or more future locations of the ground based-object and to detect an upcoming spatial proximity between the ground-based object and the ground-based vehicle, and causing (305), upon detection of the upcoming spatial proximity, an alert signal to be provided to at least one of the ground-based object and the ground-based vehicle.

17 Claims, 6 Drawing Sheets

(51) Int. Cl.
*G06V 20/56* (2022.01)
*B64U 101/00* (2023.01)

(56) References Cited

U.S. PATENT DOCUMENTS

| | | | |
|---|---|---|---|
| 2013/0245877 A1* | 9/2013 | Ferguson | G05D 1/0246 701/23 |
| 2015/0102154 A1* | 4/2015 | Duncan | B64C 39/022 701/300 |
| 2016/0059962 A1 | 3/2016 | Abuelsaad et al. | |
| 2017/0237948 A1 | 8/2017 | Quast et al. | |
| 2017/0327035 A1 | 11/2017 | Keiser | |
| 2017/0344855 A1 | 11/2017 | Mande | |
| 2017/0358222 A1 | 12/2017 | Schubert | |
| 2018/0029706 A1* | 2/2018 | Baruch | H04L 67/55 |
| 2018/0181125 A1 | 6/2018 | Ceccom | |
| 2018/0343401 A1 | 11/2018 | Campbell | |
| 2019/0071043 A1* | 3/2019 | Singh | B60R 21/0134 |
| 2019/0147260 A1 | 5/2019 | May | |
| 2020/0020231 A1* | 1/2020 | Dhiman | G06V 20/588 |
| 2020/0189573 A1* | 6/2020 | King | B60W 30/0956 |

FOREIGN PATENT DOCUMENTS

| | | |
|---|---|---|
| CN | 109564437 A | 4/2019 |
| FR | 2986647 A3 | 8/2013 |
| WO | 2019087186 A1 | 5/2019 |
| WO | 2020013525 A1 | 1/2020 |
| WO | WO-2020013525 A1 * | 1/2020 ............. B60K 35/00 |

OTHER PUBLICATIONS

Swedish Search Report and Official Action from corresponding Swedish Application No. 1950651-8, dated Nov. 28, 2019, 6 pages.
Summons to Attend Oral Proceedings dated Sep. 4, 2023 for Application Serial No. 20166571.8 (9 pages).

* cited by examiner

MONITORING VEHICLE MOVEMENT FOR TRAFFIC RISK MITIGATION

RELATED APPLICATION DATE

This application claims the benefit of Swedish Patent Application No. 1950651-8, filed Jun. 3, 2019, the disclosure of which is incorporated herein by reference in its entirety.

TECHNICAL FIELD

The present disclosure relates generally to mitigating traffic risks and, more particularly, to techniques for monitoring movement of vehicles for mitigation of traffic risks in relation to a moveable ground-based object.

BACKGROUND

Automotive vehicles are increasingly provided with sensors capable of obtaining information about the surroundings of the vehicle. The information may be provided to safety functions in the vehicle, which may warn the driver of a potentially dangerous situation or take automatic action to mitigate such a traffic risk, for example by activating the brakes, reducing the speed of the vehicle, or steering the vehicle. Autonomous vehicles (AVs) are in development and are foreseen to include advanced control systems capable of interpreting sensory information as well as inter-vehicle communication to identify appropriate navigation paths, obstacles and relevant signage, and thereby control the movement of the vehicle with little or no human input.

Irrespective of the level of sophistication of the safety functions and the control systems, there is still a risk that the vehicle sensors are unable to properly detect a dangerous situation, for example with respect to unprotected road users, livestock and wildlife, in particular when any such object is hidden from view of the driver and/or vehicle sensors.

SUMMARY

It is an objective to at least partly overcome one or more limitations of the prior art.

A further objective is to provide a technique for monitoring movement of vehicles for mitigation of traffic risks in relation to moveable ground-based objects such as unprotected road users, livestock and wildlife.

A yet further objective is to provide such a technique which is resource-efficient and automated.

One or more of these objectives, as well as further objectives that may appear from the description below, are at least partly achieved by a method of mitigating traffic risks, a computer-readable medium, and a monitoring system according to the independent claims, embodiments thereof being defined by the dependent claims.

Still other objectives, as well as features, aspects and technical effects will appear from the following detailed description, the attached claims and the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Figure 1A:
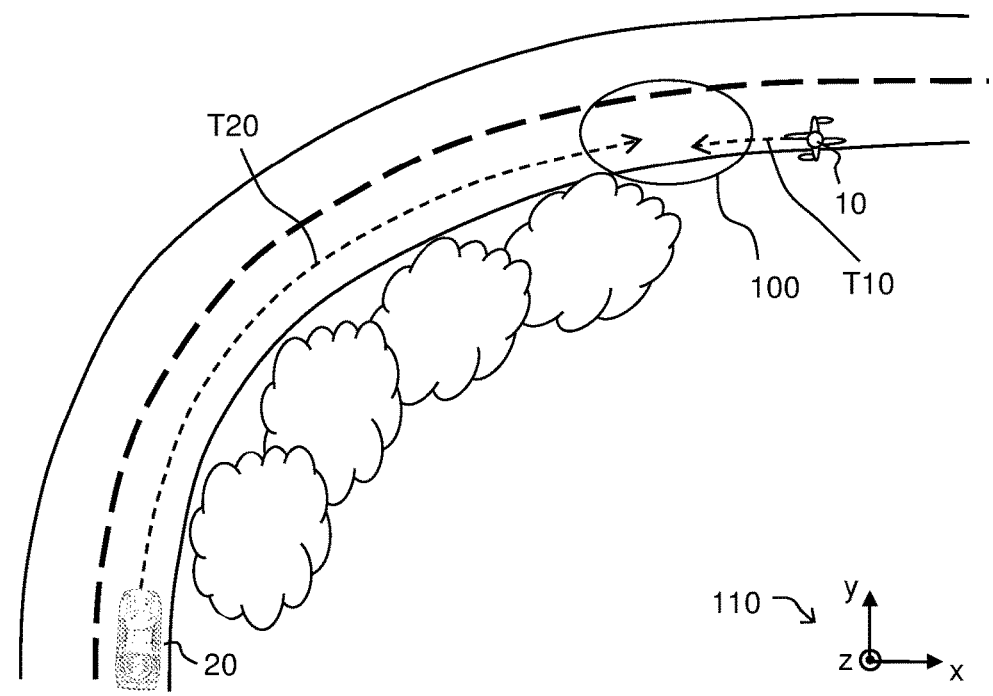
FIG. 1A is a top view of a situation causing a traffic risk between two road users.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce or determine a result, for example by use of a computer.

As used herein, a "group of vehicles" is intended to imply a provision of two or more vehicles. Likewise, the terms "multiple", "plural" and "plurality" are intended to imply provision of two or more vehicles.

As used herein, the attribute "predicted" implies an event or value that is planned, scheduled or estimated at one or more future time points. Thus, a predicted trajectory of an object refers to a future movement of the object. Depending on the type of object, the predicted trajectory may be known from a predefined schedule or be estimated based on previous movement and/or other input data, for example a vision-based guidance system.

As used herein, "air-based vehicle" is intended to imply any vehicle that is propelled for movement or levitation above the surface of the Earth and is operable to track a ground-based object. Thus, air-based vehicles include aircrafts such as unmanned aerial vehicles (UAVs), also known as drones, and helicopters, as well as artificial satellites including both geostationary and non-geostationary satellites. The air-based vehicles may be controlled by an onboard automated control system, an onboard human pilot, a ground-based control system or a ground-based human pilot.

As used herein, "ground-based vehicle" is intended to imply any self-propelled vehicle for movement in contact with the surface of the Earth, including but not limited to automotive cars, lorries, motorbikes, buses, etc. The ground-based vehicle may be controlled by an automated control system and/or by a human driver.

As used herein, "ground-based object" is intended to imply any moving or moveable object that is in contact with the surface of the Earth and may be tracked by an air-based vehicle. The ground-based object may be any animate or inanimate object, including unprotected human individuals, as well as livestock, pets, wild animals, etc. The unprotected human individuals may, for example, be on foot, running or operating a human-powered vehicle such as a bicycle. For the avoidance of doubt, a ground-based object could be one or more human individuals, such as a group of runners or a group of cyclists.

A used herein, "vision sensor" is intended to imply any sensor or combination of sensors that provides a two- or three-dimensional representation within a field of view. The vision sensor may be or include any of one or more light sensors or cameras (for example in the visible spectrum, the infrared spectrum, etc.), one or more Light Detection and Ranging (LIDAR) systems, one or more Radio Detection and Ranging (RADAR) systems, one or more ultrasonic sensors, etc.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the term "and/or" between elements includes any and all combinations of one or more of the elements.

Embodiments are related to detection and mitigation of traffic risks, specifically traffic risks that involve a potential collision between a ground-based vehicle (denoted GBV in the following) and a ground-based object (denoted GBO in the following). The traffic risks may be detected by use of air-based vehicles (denoted ABV in the following), which are configured and/or operated to follow or "track" a respective GBO.

FIG. 1A is a top plan view of a stretch of a road and exemplifies a traffic situation that may lead to a traffic risk. The road defines a right-hand bend or curve, and an unprotected individual 10 is moving towards the bend from the right while a car 20 enters the bend from the opposite direction. The dashed arrows T10, T20 illustrate likely trajectories of the individual 10 and the car 20 subsequent to the illustrated time point. Given these trajectories, the individual 10 and the car 20 are likely to meet at the region 100. Thereby, the region 100 is associated with an interference between the individual 10 and the car 20, potentially leading to a collision or a belated evasive action by the car 20 potentially resulting in a secondary traffic risk. The situation in FIG. 1A is exacerbated by poor visibility between the individual 10 and the car 20 as a result of the trees that line the inside of the bend.

Figure 1B:
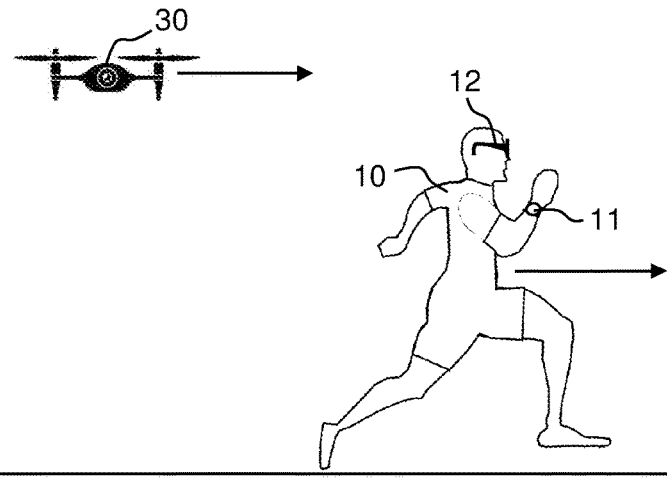
FIG. 1B illustrates one of the road users when tracked by a drone.

FIG. 1B is a side view of an individual 10 that is performing fitness training, for example by running along the road in FIG. 1A. A drone 30 is operated to follow the individual 10 by use of a tracking mechanism and is thus "personalized". The tracking mechanism may be of any type. For example, vision-based object tracking is a widely used tracking mechanism, in which the drone 30 is operated to maintain the object within the field of view of a vision sensor, e.g. a camera system. In another example, the drone 30 may be operated to attain a given position in relation to the individual 10 based on position data for the drone 30 and for the individual 10 in a common coordinate system, for example a global coordinate system (cf. 110 in FIG. 1A). For example, the position data may be given by a GPS sensor on the drone 30 and the individual 10, respectively. In the illustrated example, the individual 10 carries an electronic device 11 such as a smart watch, fitness monitor or the like. The individual 10 also carries wearable eyewear 12 which may include a vision sensor. The above-mentioned GPS sensor may, for example, be located in the electronic device 11 or the eyewear 12. The electronic device 11 and/or the eyewear 12 may be configured to provide audible, visual or tactile feedback to the wearer. Further, the electronic device 11 and/or eyewear 12 may be configured for wireless communication according to any suitable protocol.

Figure 2A:
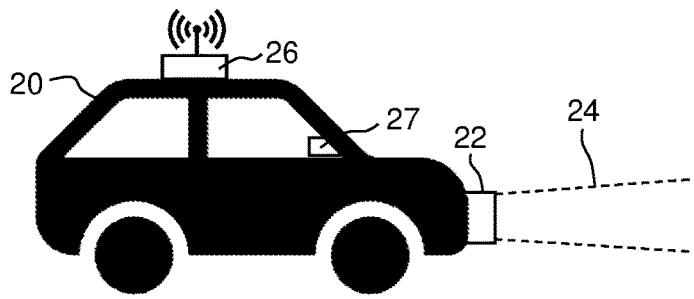
FIGS. 2A-2B are side views of an automotive vehicle and a drone with wireless connectivity and vision sensors.

FIG. 2A is a side view of a car 20, which may be controlled by a human driver and/or by a vehicle control system. In the illustrated example, the car 20 comprises a vision sensor 22 that defines a field of view 24. The vision sensor 22 need not be a unitary sensor device as shown but may comprise an aggregation of separate sensor devices that have any placement or distribution on the car 20 and that collectively define the field of view 24. The vision sensor 22 may be operated to provide information about the surroundings of the car 20 to the driver and/or the vehicle control system. The car 20 further comprises a local control device 26 which is configured for wireless communication according to any suitable protocol. The local control device 26 may comprise a position sensor configured to determine a current position of the car 20 in a global coordinate system (cf. 110 in FIG. 1A). The position sensor may comprise a GPS sensor. Depending on implementation, the local control device 26 may communicate wirelessly with local control devices 26 on other cars 20, an external server, local control devices on drones 30, etc. The car 20 may also comprise a feedback device 27 for providing visual or audible feedback to a driver.

Figure 2B:
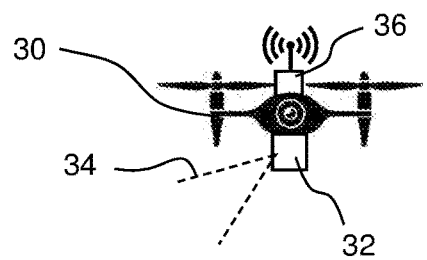

FIG. 2B is a side view of a drone 30. The drone 30 comprises a vision sensor 32, which may include one or more cameras and defines a field of view 34. The drone 30 further comprises a local control device 36 which is configured for wireless communication according to any suitable protocol. The local control device 36 may comprise a position sensor configured to determine a current position of the drone 30 in a global coordinate system (cf. 110 in FIG. 1A). The position sensor may be a GPS sensor. Depending on implementation, the local control device 36 may communicate wirelessly with the electronic device 11 and/or eyewear 12 on the tracked individual 10, local control devices 36 on other drones 30, an external server, local control devices 26 on cars 20, etc.

The following description will refer to ground-based objects (GBOs), ground-based vehicles (GBVs), and air-based vehicles (ABVs). The individual 10 is an example of a GBO, the car 20 is an example of a GBV, and the drone 30 is an example of an ABV.

Figure 3A:
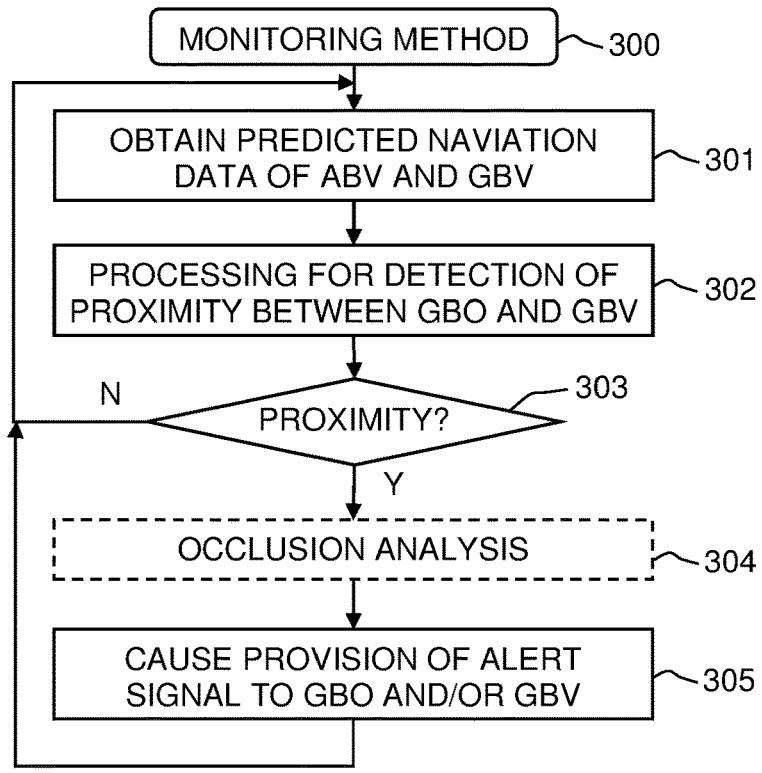
FIGS. 3A-3D are flow charts of methods performed in a monitoring system in accordance with embodiments.

FIG. 3A is a flow chart of a monitoring method 300 in accordance with an embodiment. The monitoring method 300 serves to mitigate traffic risks among a group of vehicles comprising at least one GBV 20 and at least one ABV 30, where each ABV 30 tracks a respective GBO 10. The method 300 is applicable for mitigation of traffic risks between any number of GBVs 20 and ABVs 30. For simplicity, the method 300 will be presented for a single GBV 20 and a single ABV 30.

The method 300 is performed repeatedly at consecutive time points while the ABV 30 is flying. Each such consecutive time point may be regarded as a current time point. As will be exemplified in further detail below with reference to FIGS. 7A-7C, the method 300 may be centralized or distributed and executed on an external control device and/or on one or more local control devices 26, 36.

In one embodiment, the method 300 involves an initial grouping step (not shown) of defining the group of vehicles, for example by use of a clustering algorithm. For example, the initial step may determine the group of vehicles among a larger plurality of vehicles by space-time cluster analysis of respective locations of the larger plurality of vehicles at the current time point and/or at one or more future time points. The group of vehicles may be given by a cluster that includes a selected ABV 30. The initial grouping step may perform the clustering based on the respective locations and associated time points, or perform an initial partitioning of locations by time points followed by a location-based clustering.

Step 301 obtains predicted navigation data (PND) for GBV 20 and ABV 30. The PND estimates the future movement of GBV 20 and ABV 30 in relation to the current time point. Such future movement also includes the option that the GBV/ABV will not move. The PND may be determined in any suitable way, for example based on the historic movement of GBV 20 and ABV 30 up to the current time point, the local topology (location of the road, location of slopes and bends, road condition, etc.), the current traffic situation (road works, amount of traffic, traffic jams, speed limits, traffic signs, traffic lights, etc.), a predefined movement plan such as a predefined planned route, or any combination thereof. The historic movement may be determined based position data from the position sensor in the respective local control device 26, 36 (FIGS. 2A-2B). The PND may be given in any suitable format. In one example, the PND comprises one or more pairs of locations and times for GBV 20 and ABV 30, respectively. The respective location may be given as relative coordinates, for example in relation the current location at the current time point, or as absolute coordinates in a global coordinate system, for example as latitude and longitude coordinates. In another example, the PND comprises a functional representation of a respective predicted trajectory of GBV 20 and ABV 30, for example given as a polynomial. In yet another example, the PND comprises predicted speed and direction data of GBV 20 and ABV 30 as a function of time. In all these examples, the PND is considered to comprise a respective predicted trajectory of the GBV 20 and the ABV 30.

Step 302 processes the PND for detection of an upcoming spatial proximity between GBV 20 and GBO 10, according to any suitable criterion (see below). It is realized that step 302 also involves estimating one or more future locations of GBO 10 based on the PND of ABV 30, in order to allow for the detection of the upcoming spatial proximity between GBV 20 and GBO 10. In a simple and non-limiting example, ABV 30 is controlled to fly directly above GBO 10, causing a predicted trajectory of GBO 10 to be equal to the predicted trajectory of ABV 30 as projected onto the ground. More advanced and generic algorithms for movement estimation of GBO 10 will be described below with reference to FIG. 3B.

If no spatial proximity is detected by step 302, step 303 directs the method 300 to execute step 301 at a subsequent time point. If step 302 detects an upcoming spatial proximity, step 303 may direct the method to step 305, which causes an alert signal to be provided to at least one of GBO 10 and GBV 20. Subsequent to step 305, the method 300 may proceed to execute step 301 at a subsequent time point.

Reverting to the example in FIG. 1A, step 301 obtains PND for the car 20 and for the drone 30 that tracks the individual 10 (FIG. 2A). The PND is thereby indicative of the predicted trajectory T20 for the car 20, and the predicted trajectory T10 for the individual 10. By comparing the predicted trajectories T10, T20, step 302 identifies a spatial proximity between the runner 10 and the car 20 at a future time point corresponding to region 100 in FIG. 1A. By step 305, an alert signal may be provided to the car 20 and/or to the individual 10 well in advance of this future time point. In one example, the alert signal causes the feedback device 27 to inform a driver of the car 20 about the approaching individual 10. In another example, the alert signal causes a vehicle control system to pre-emptively adjust the speed and/or direction of the car 20 to counteract the spatial proximity. In another example, the alert signal causes a vehicle control system to generate an audible warning to the individual 10, for example by activating the horn of the car 20. In a further example, the alert signal causes the monitoring device 11 and/or the eyewear 12 to inform the individual 10 about the approaching car 20. It is realized that the method 300 will mitigate the traffic risk between the car 20 and the individual 10 and that the method 300 may be fully automated. Further, since the alert signal is only provided after detection of an upcoming spatial proximity, the method 300 is resource-efficient in terms of wireless data communication and limits the cognitive load on the individual 10 and/or the driver of the car 20.

Figure 3B:
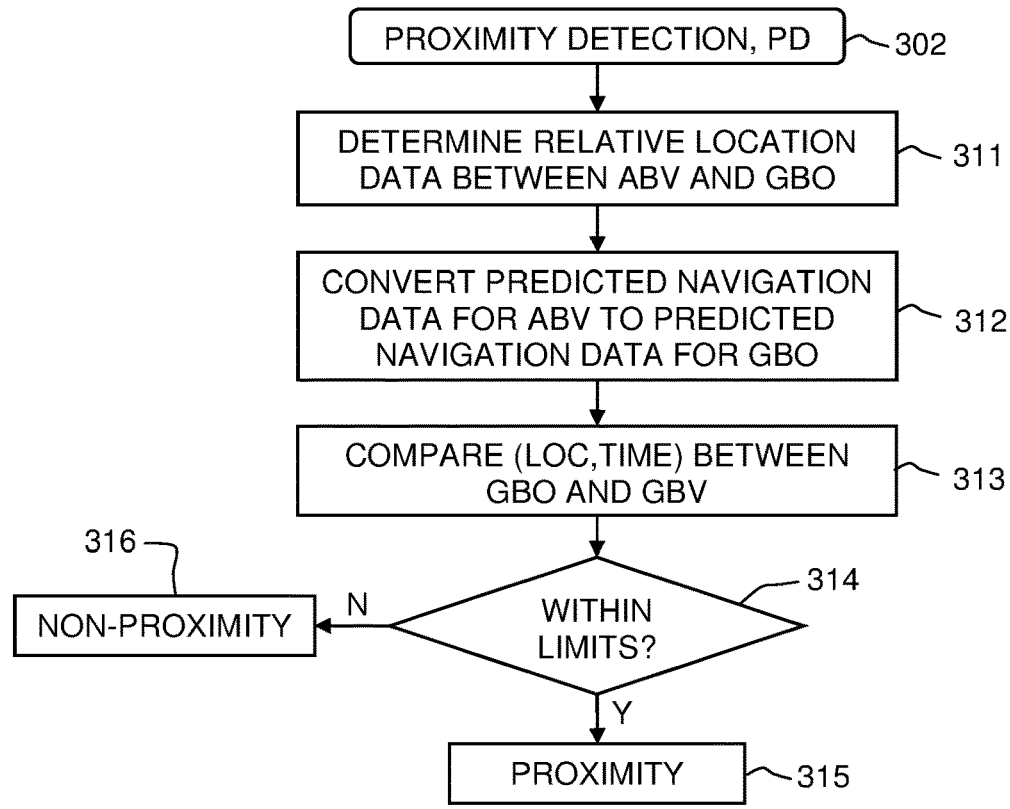

FIG. 3B shows an example implementation of the proximity detection (PD) according to step 302 in FIG. 3A. Step 311 determines relative location data that defines the relative location between the GBO 10 and the ABV 30 at the current time point and/or at one or more future time points. For example, the relative location data may comprise a direction and a distance from the ABV 30 to the GBO 10. In one example, the relative location is fixed and predefined, and step 311 may retrieve the relative location data from memory. In another example, the relative location may be estimated, e.g. by the ABV 30, and included in the PND for the AFV 30. Given the relative location data, step 312 converts the PND for the ABV 30 into a predicted trajectory of the GBO 10 (cf. the second predicted trajectory T10 in FIG. 1A). The skilled person understands that the conversion of step 312 may involve a simple mathematical transformation operation. After step 312, the method 300 has acquired (by step 301) a first predicted trajectory of the GBV 20, comprising a sequence of first locations and associated first time points in relation to a reference time point, and (by steps 311-312) a second predicted trajectory of the GBO 10, comprising a sequence of second locations and associated second time points in relation to the reference time point. The reference time point may be given by a common clock. Step 313 involves comparing or mapping the first locations and the associated first time points of the first predicted trajectory to the second locations and the associated second time points of the second predicted trajectory. Based on the mapping in step 313, step 314 evaluates if the distance between pairs of first and second locations is below a spatial limit and if a time difference between the first time point and second time point associated with the first and second time locations in the respective pair is below a temporal limit. If one or more pairs fulfil these spatial and temporal criteria, step 314 detects an upcoming spatial proximity (step 315), otherwise no upcoming spatial proximity is detected (step 316).

Figure 4A:
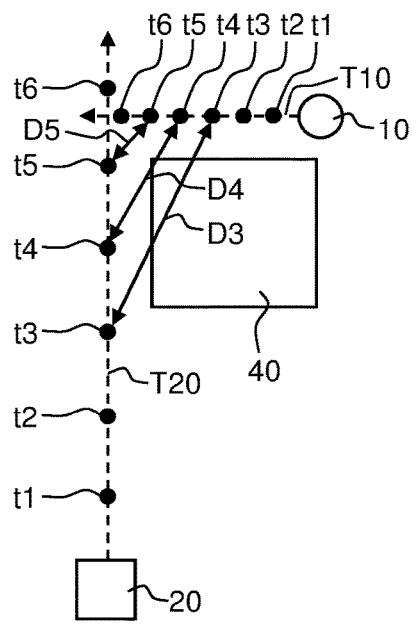
FIGS. 4A-4C are top views of a traffic situation and exemplify the methods in FIGS. 3A-3C.

The proximity detection of FIG. 3B is further exemplified in FIG. 4A, which is a top plan view of a GBO 10 and a GBV 20 at a current time point and illustrates corresponding predicted trajectories T10, T20. Each trajectory T10, T20 is illustrated as a sequence of locations (black dots) associated with a respective time point t1-t6. The illustrated situation may correspond to a car 20 and an individual 10 moving along a respective road towards an intersection. A building 40 is located at the intersection, potentially hiding the individual 10 and the car 20 from each other. In the illustrated example, it is assumed that the same time points t1-t6 are present in the predicted trajectories T10, T20. Here, the mapping of step 311 may involve matching pairs of locations in the trajectories T10, T20 and computing the distance between each such pair, exemplified by distances D3-D5 in FIG. 4A. Assuming that at least one distance D3-D5 falls below the spatial limit, an upcoming spatial proximity is detected, that is, a risk for a collision at the intersection. In this example, the time difference between the pairs is zero and the temporal criterion is automatically fulfilled. The skilled person understands that the time difference between matched pairs also should be accounted for if the time points t1-t6 differ between the predicted trajectories T10, T20. In one implementation, step 313 arranges the first and second locations in the first and second predicted trajectories in pairs based on their associated time points, for example by pairing the respective first location with the second location that is closest in time to the first location, and computes the distance and the time difference for each pair of first and second locations. In another implementation, step 313 resamples one of the predicted trajectories T10, T20 so that first and second locations are associated with the same time points, and computes the distance between each pair of first and second locations. In the latter implementation, like in the example of FIG. 4A, the temporal criterion is inherently fulfilled.

In one embodiment, at least one of the spatial and temporal limits are set as a function of a velocity vector of the GBV 20 and/or a velocity vector of the GBO 10. The velocity vector may be an actual velocity vector at the current time or a predicted velocity vector at a future time point. For example, if the method determines that the first and second predicted trajectories intersect, the spatial limit and/or the temporal limit may be set to scale with the velocity of the GBV 20 and/or the GBO 10 towards the point of intersection. This will effectively increase the size of the region that is deemed to involve a traffic risk if occupied by the GBO 10 and the GBV 20 at the same time (cf. 100 in FIG. 1A).

Reverting to FIG. 3A, the method 300 may involve a step 304 that analyses the line-of-sight (LOS) between the GBV 20 and the GBO 10 for detection of an occluded LOS. The LOS comprises all straight paths that extend from one or more actual or fictitious viewpoints on the GBV/GBO to the GBO/GBV. An occluded LOS implies that the GBV 20 is unable to detect the GBO 10 from the viewpoint(s) on the GBV 20, or that the GBO 10 is unable to detect the GBV 20 from the viewpoint(s) on the GBO 10. On the GBV 20, the viewpoint(s) may correspond to the vision sensor 22 (FIG. 2A) and/or the eyes of a driver. On the GBO 10, the viewpoint(s) may correspond to the eyes of the individual(s) tracked by the ABV 30 and/or a vision sensor if present (cf. eyewear 12 in FIG. 1B).

As indicated by dashed lines in FIG. 3A, the occlusion analysis of step 304 is optional. The outcome of step 304 may be used by step 305 to determine if and/or when an alert signal is to be provided. Alternatively or additionally, step 305 may provision a dedicated alert signal that indicates an occluded LOS in relation to an upcoming spatial proximity.

One advantage of the occlusion analysis is that the GBV/GBO may be specifically alerted of a traffic risk that is likely to be unexpected. The occlusion analysis may also be implemented to restrict the number of alert signals, thereby reducing the cognitive load on the individual 10 and/or the driver of the GBV 20, or the computational load on the vehicle control system in the GBV 20. Reverting to FIG. 1A, the trees lining the right-hand side of the road will block the view of both the individual 10 and the car 20. It is realized that it may be particularly beneficial to alert the individual 10 and/or the car 20 of the upcoming traffic risk in such a situation.

If implemented, step 304 may be performed when the method 300 has detected an upcoming spatial proximity. This improves the processing-efficiency of the method 300, by limiting the occlusion analysis of step 304 to situations that are deemed to pose a traffic risk based on the proximity detection of step 302.

In the following, embodiments of the occlusion analysis will be described with reference to FIGS. 3C-3D. The embodiment in FIG. 3C (first occlusion analysis, OA1) is vision-based and operates on sensor data from a vision sensor to detect or predict an occluded LOS. The OA1 embodiment is primarily capable of detecting occlusions by static objects in the surroundings of the GBO 10 and the GBV 20. The embodiment in FIG. 3D (second occlusion analysis, OA2) is PND-based and operates on PND from one or more further GBVs in the group of vehicles to detect or predict an occluded LOS. The OA2 embodiment is thus capable of detecting occlusions caused by moving obstacles. It is realized that the OA1 and OA2 embodiments are at least partly complementary and may be combined in step 304. For example, an occluded LOS may be detected by step 304 whenever at least one of the OA1 and OA2 embodiments indicates an occluded LOS.

Figure 3C:
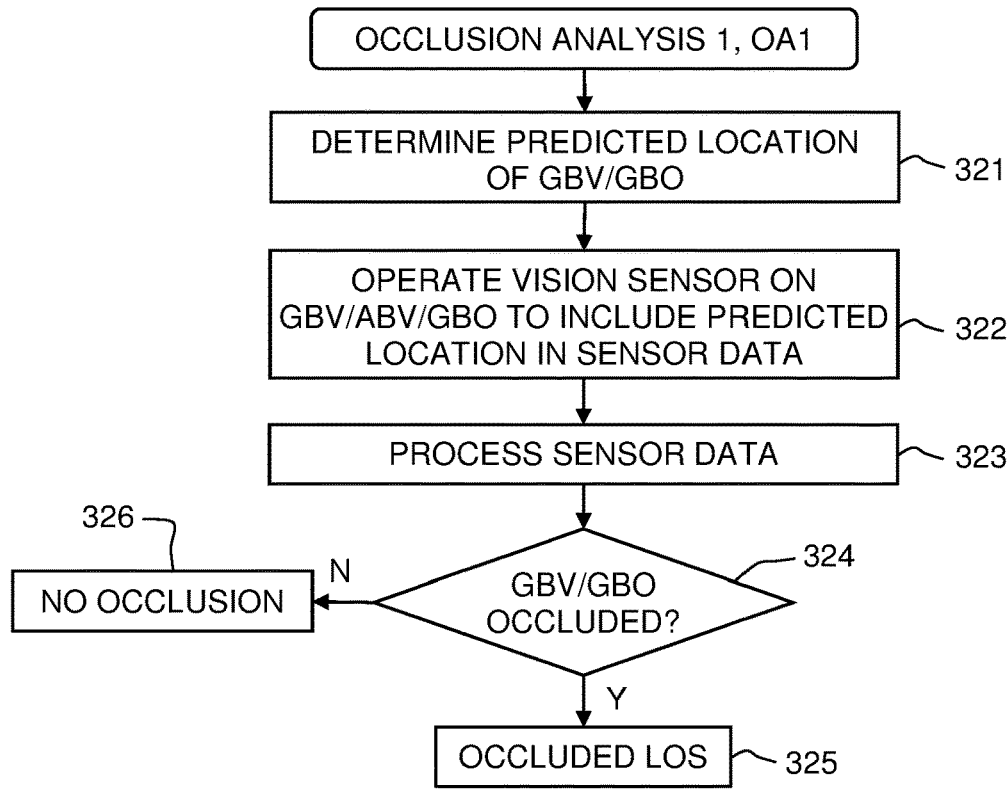

The first occlusion analysis, OA1, is exemplified in FIG. 3C and is performed from an origin onto a target. The origin is one of the GBO 10 and the GBV 20, and the target is the other of the GBO 10 and the GBV 20. Step 321 determines a predicted location of the target at a selected time point, and step 322 operates a vision sensor at the selected time point to capture sensor data that includes the predicted location. The selected time point may be the current time point or one or more future time points. If the origin is the GBV 20, step 322 may operate the GBV vision sensor 22 to capture sensor data with the predicted location positioned within the field of view 24 (FIG. 2A). If the origin is the GBO 10 and the GBO 10 comprises a vision sensor (cf. 12 in FIG. 1B), step 322 may operate the GBO vision sensor to capture sensor data with the predicted location positioned within the field of view. Alternatively, if the origin is the GBO 10, step 322 may operate the vision sensor 32 on the tracking ABV 30 to capture sensor data with the predicted location positioned within the field of view 34. Step 323 processes the sensor data captured by step 322 for detection of intervening object(s) between a reference point and the predicted location. The processing of step 323 may involve conventional computer vision methods such as image segmentation and object detection, to detect intervening objects between the reference point and the predicted location. When the sensor data originates from the GBV vision sensor 22 or the GBO vision sensor, the reference point may be co-located with the vision sensor. When the sensor data originates from the ABV vision sensor 32, the reference point is suitably located on the GBO 10, e.g. co-located with the eyes of the individual(s). In the latter example, step 323 may operate a transformation matrix on the sensor data from the ABV vision sensor 32 to generate synthetic sensor data that would have been captured by a vision sensor co-located with the reference point on the GBO. The transformation matrix may be predefined if the ABV 30 has a fixed and predefined location relative to the GBO 10. Otherwise, the transformation matrix may be computed based on the above-mentioned relative location data. In a variation, step 322 may evaluate more than one reference point.

Based on the detection of intervening objects in step 323, step 324 evaluates the LOS between the reference point and the predicted location is blocked by the intervening object(s). In this evaluation, step 324 may also account for the extent of the target (GBO/GBV) around the predicted location. If the LOS is found to be blocked, step 324 indicates an occluded LOS (step 325), otherwise a non-occluded LOS is indicated (step 326).

In a variant, OA1 also involves predicting the LOS of the origin at one or more subsequent time points based on the sensor data, e.g. an image, by determining a predicted location of the origin in the sensor data and evaluating if the LOS between the predicted location of the origin and the corresponding predicted location of the target is blocked by any object included in the sensor data.

Figure 4B:
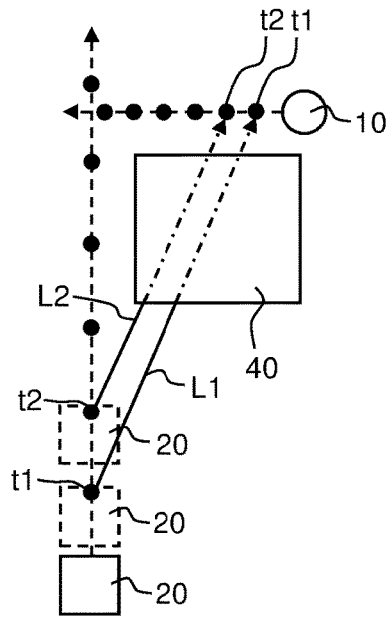
Figure 4C:
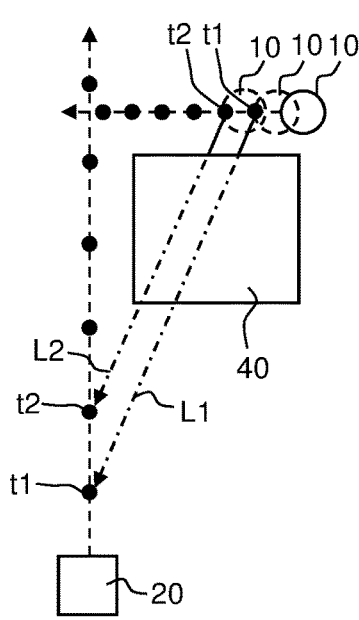
Figure 4D:
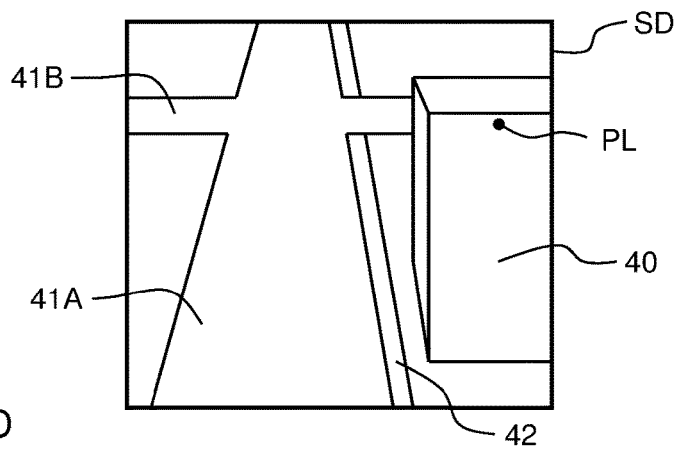
FIG. 4D is a representation of the traffic situation captured by a vision sensor on a ground-based vehicle.

OA1 is further exemplified in FIGS. 4B-4C, which correspond to FIG. 4A. In FIG. 4B, OA1 is performed by determining predicted locations of the GBO 10 at future time points t1 and t2 (step 321) and activating the vision sensor 22 of the GBV 20 at t1 and t2, as indicated by dashed squares (step 322). The resulting sensor data is then subjected to an LOS analysis at the respective time point (step 323). In FIG. 4B, the LOS at t1, t2 is represented by arrows L1, L2. In the illustrated example, the LOS analysis determines that L1 and L2 are occluded by the object 40. FIG. 4D shows an example of sensor data SD in the form of a 2D image captured by the vision sensor 22 of the GBV 20 at t1. The image allows the LOS analysis to, for example, identify roads 41A, 41B, a pavement 42 and a building 40. The predicted location of the GBO is mapped onto the image and designated by PL. Based on the image in FIG. 4D, the LOS analysis will find that GBO 10 is hidden from view by the building 40. In FIG. 4C, OA1 is performed by determining predicted locations of the GBV 20 at future time points t1 and t2 (step 321) and activating the vision sensor 12 of the GBO 10 or the vision sensor 32 of the ABV 30 at time points t1 and t2 (step 322). The LOS analysis is performed on the sensor data captured at the respective time point (step 323), possibly after applying the above-mentioned transformation matrix on the sensor data from the ABV vision sensor 32. Like in FIG. 4B, the LOS analysis determines that L1 and L2 are occluded.

Figure 3D:
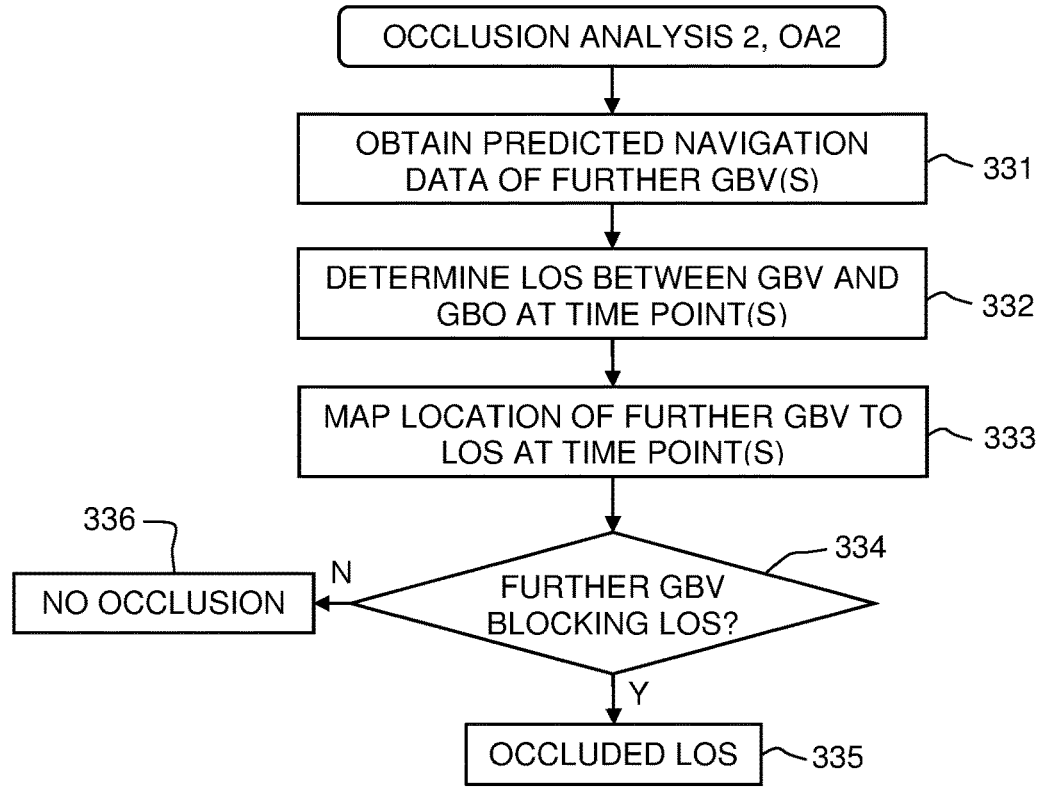

The second occlusion analysis, OA2, is exemplified in FIG. 3D. Step 331 obtains PND for one or more further GBVs in the vicinity of the GBV 20 and the GBO 10. Step 332 determines the LOS between the GBV 20 and the GBO 10 at the current time point and/or one or more future time points. Step 333 maps the location of each further GBV, given by the PND obtained in step 331, to the LOS at the respective time point. Step 334 evaluates the mapping of step 333 and indicates an occluded LOS when at least one further GBV blocks the LOS at one or more time points (step 335). Otherwise, step 334 may indicate a non-occluded LOS (step 336). Step 334 may account for the extent of the further GBV in the evaluation.

Figure 5:
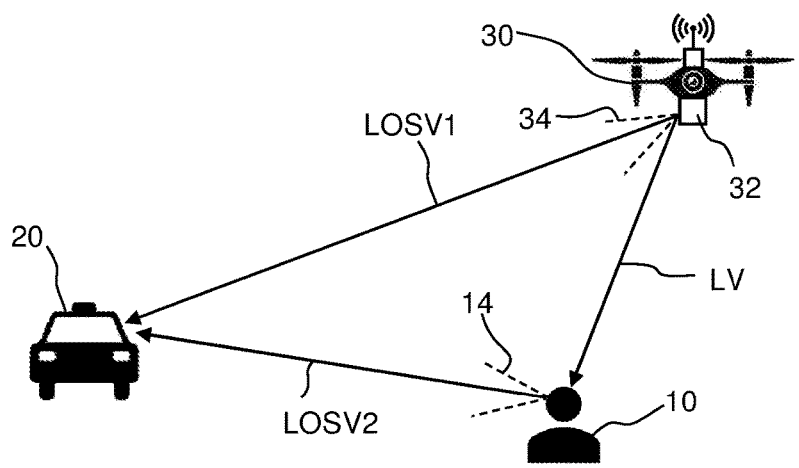
FIG. 5 exemplifies a conversion step of the method in FIG. 3D.

Step 332 may use the PND obtained in step 301 (FIG. 3A) to determine the LOS at the respective time point, that is, the PND for the ABV 30 and the GBV 20. An example embodiment for determining the LOS from GBO 10 to GBV 20 is illustrated in FIG. 5. A first LOS vector (LOSV1) from AVB 30 to GBV 20 is given by the locations of AVB 30 and GBV 20 at a common time point according to the PND. A location vector (LV) from ABV 30 to GBO 10 may be known or computed, by analogy with the above-mentioned relative location data. A second LOS vector (LOSV2) from GBO 10 to GBV 20 is given by the vector difference between LOSV1 and LV, where LOSV2 represents the LOS from GBO 10 to GBV 20 to be determined in step 332. A corresponding computation may be used for determining the LOS from GBV 20 to GBO 10.

Figure 6A:
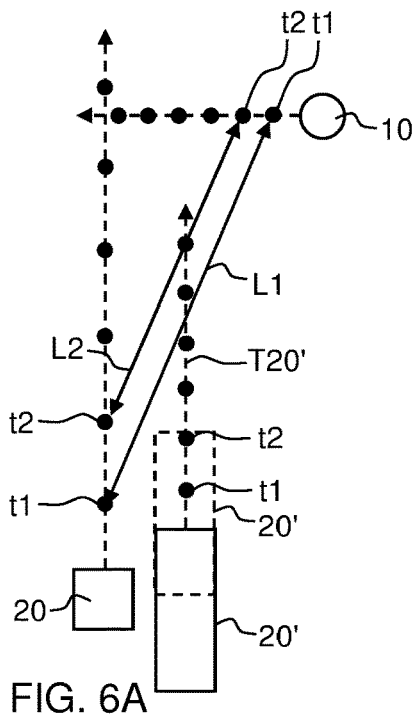
FIGS. 6A-6B are top views of a traffic situation and exemplify the method in FIG. 3D.
Figure 6B:
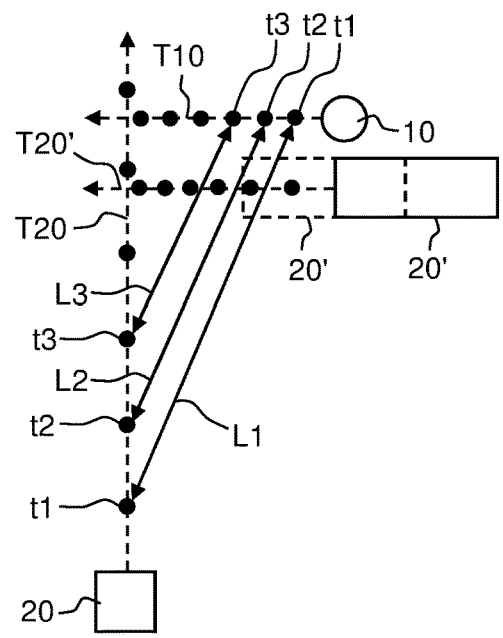

OA2 is further exemplified in FIGS. 6A-6B, which are top plan views of a GBO 10, a GBV 20 and a further GBV 20' at a current time point and illustrates corresponding predicted trajectories, T10, T20 and T20'. Each trajectory T10, T20, T20' is illustrated as a sequence of locations (black dots) associated with a respective time point. FIG. 6A may correspond to a car 20 and an individual 10 moving along a respective road towards an intersection while the car 20 overtakes a slower-moving truck 20'. In FIB. 6B, the truck 20' is instead moving alongside the individual 10 while slowing down towards the intersection.

In FIG. 6A, OA2 is performed by determining the LOS between the individual 10 and the car 20 at future time points t1 and t2 (step 332) and mapping the location of the truck 20' to the LOS at t1 and t2 (step 333). In FIG. 6A, the LOS at t1, t2 is represented by arrows L1, L2, and the extent of the truck 20' at t2 is indicated by a dashed rectangle. It is realized that the evaluation (step 334) will determine that L1 and L2 are not occluded by the truck 20', even when accounting for its extent. In FIG. 6B, OA2 determines the LOS at t1, t2, t3, as represented by arrows L1, L2, L3. The location of the truck 20' at t2 is indicated by a dashed rectangle. Here, the evaluation (step 334) may determine that at least L2 and L3 are occluded by the truck 20'.

In the situations of FIGS. 4B-4C and 6A-6B, step 305 of the method 300 (FIG. 3A) may refrain from providing the alert signal in FIG. 6A, and provide the alert signal in FIGS. 4B-4C and 6B. In a variant, step 305 may provide the alert signal in the form of a proximity warning in FIG. 6A, and provide a dedicated alert signal in the form of an occlusion warning in FIGS. 4B, 4C and 6B. Many other variants are conceivable.

In one embodiment (not shown), the method 300 may comprise distributing sensor data between any combination of the GBV, the ABV and the GBO. Such distributing may be performed upon spatial proximity detection (steps 302-303) and/or occluded LOS detection (step 304). For example, the ABV 30 may transmit sensor data captured by its vision sensor 32 to the GBV 10, for example for display to the driver by the feedback device 27 or for analysis by the vehicle control system. Correspondingly, the GBV 20 may transmit sensor data captured by its vision sensor 22 to the GBO 10 via the ABV 30, for example for display on the electronic device 11 and/or the eyewear 12. This embodiment will give the recipient of the sensor data a better understanding of the impending event.

In one embodiment (not shown), the method 300 may comprise the ABV 30 measuring and reporting characterizing data of the GBO 10 that it is tracking. The characterizing data may include one or more size parameters, such as width, length, area, shape, number of individuals, etc. For example, a drone tracking a group of runners or cyclists may report a size parameter to automotive vehicles within a relevant range, for example the group of vehicles given by the above-mentioned clustering. In one embodiment, the ABV 30 autonomously reports the characterizing data to all GBVs 20 in the group of vehicles. In another embodiment, the ABV 30 is caused to selectively, upon the spatial proximity detection and/or the occluded LOS detection, report the characterizing data to all GBVs in the group of vehicles or to the GBV 20 in spatial proximity. In either embodiment, the reporting may be performed repeatedly to provide updated characterizing data. One or more GBVs 20 will thus be fed relevant real-time information about the GBO 10, allowing the respective driver and/or vehicle control system of the respective GBV 20 to take appropriate action for risk mitigation.

Figure 7A:
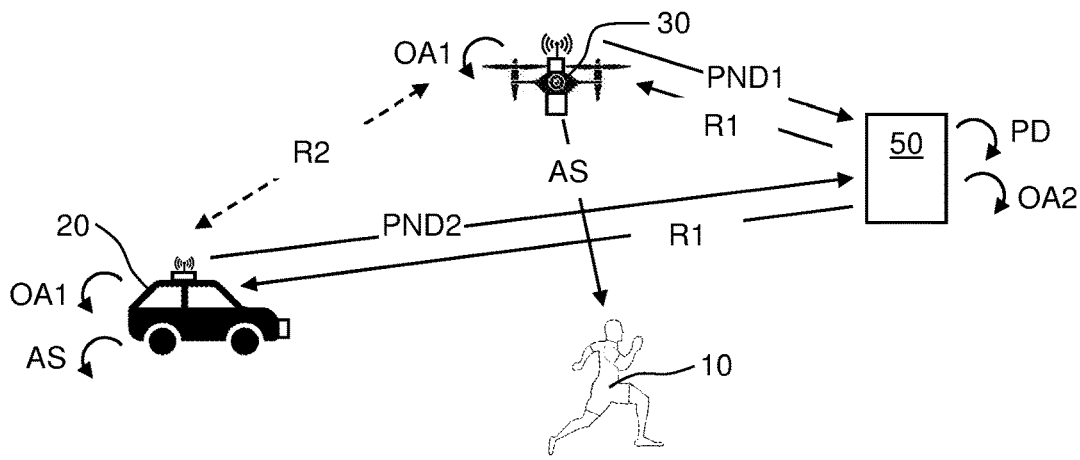
FIGS. 7A-7C are examples of signalling and partitioning of functionality within monitoring systems in accordance with embodiments.
Figure 7B:
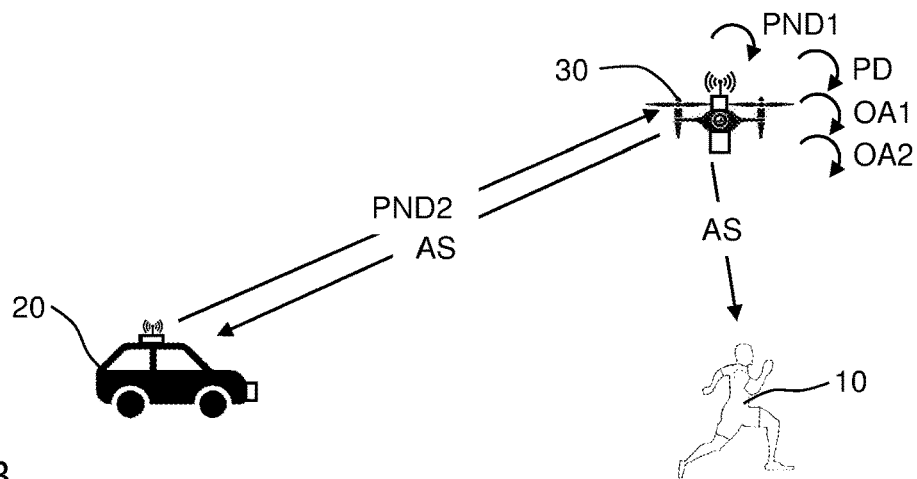
Figure 7C:
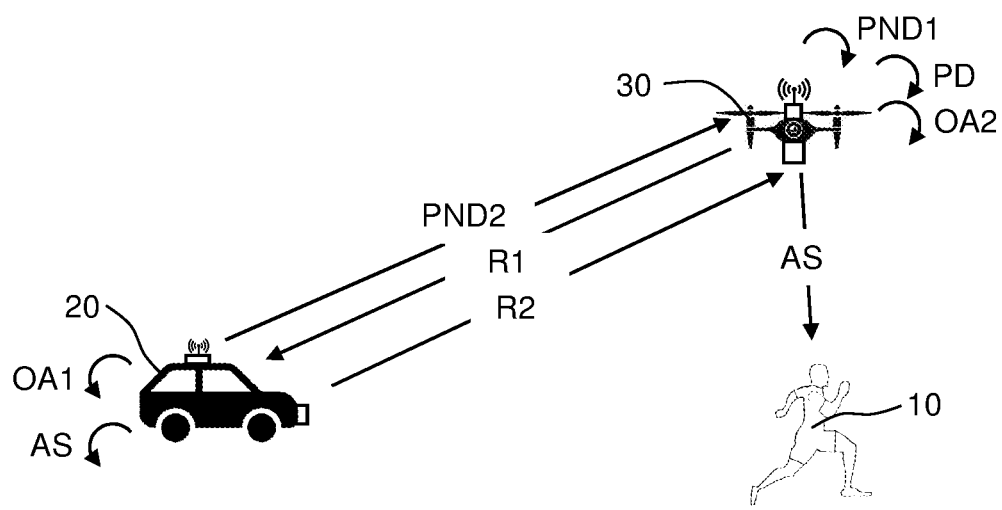

As noted above, the method 300 of FIG. 3A may be deployed in many different ways. A few example deployments are shown in FIGS. 7A-7C. Steps performed by the GBV 20 or the ABV 30 may be implemented by a respective local control device 26, 36 (FIGS. 2A-2B).

FIG. 7A is an example of a deployment in which the GVBs 20 (one shown) and the ABVs 30 (one shown) are configured for wireless communication with a separate control device 50, e.g. a cloud or edge server. As shown, the ABV 30 and the GBV 20 communicates their predicted navigation data (PND1, PND2) to the control device 50, which then performs a proximity detection (PD), for example in accordance with FIG. 3B. If the PD indicates an upcoming proximity, the control device 50 may alert the GBV 20 and/or the GBO 10 by transmitting a first message (R1) indicative of the PD result to the GBV/ABV. R1 may cause the ABV 30 to provide the alert signal (AS) to the GBO 10. As indicated, the control device 50 may perform the second occlusion analysis (OA2), for example in accordance with FIG. 3D, by obtaining predicted navigation data from one or more further GBVs (not shown). If OA2 indicates an occluded LOS, the control device 50 may alert the GBV 20 and/or the GBO 10 by transmission of R1. As indicated, the GBV 20 and/or the ABV 30 may also perform the first occlusion analysis (OA1), for example in accordance with FIG. 3C. If OA1 on GBV 20 indicates an occluded LOS, the GBV 20 may generate the AS locally at the GBV 20, and if OA1 on ABV 30 indicates an occluded LOS, the ABV 30 may provide the AS to the GBO 10. As shown by a dashed arrow, the GBV 20 and/or the ABV 30 may exchange a second message (R2) indicative of the OA1 result, to ensure that both the GBO 10 and the GBV 20 are alerted about an LOS occlusion. R2 may alternatively be exchanged via the control device 50. In a fully centralized deployment, the GBV 20 and the ABV 30 may transmit sensor data to the control device 50, which then performs OA1. Alternatively, OA1 is omitted. It is also conceivable that the control device 50 obtains PND1 and/or PND2 from another system, e.g. a centralized vehicle monitoring system, instead of from the GBV 20 and the ABV 30.

FIG. 7B is an example of a centralized deployment in which the ABV 30 is configured for wireless communication with the GBVs 20 (one shown) and operates as a master in relation to the GBVs 20. As shown, the GBV 20 communicates its predicted navigation data (PND2) to the ABV 30, which further internally obtains its own predicted navigation data (PND1) and then performs a proximity detection (PD). If the PD indicates an upcoming proximity, the ABV 30 may alert the GBV 20 and/or the GBO 10 by transmitting an alert signal (AS). As shown, the ABV 30 may also perform OA1 and/or OA2.

FIG. 7C is an example of a decentralized deployment in which the ABV 30 obtains PND1 and PND2 and performs the proximity detection (PD) and OA2, whereas the GBV 20 performs OA1. If the PD indicates an upcoming proximity, the ABV 30 may transmit an alert signal (AS) to the GBO 10 and a first message (R1) indicative of the PD result to the GBV 20, which thereby may be caused to generate the alert signal. R1 may alternatively be indicative of the OA2 result. As shown, the GBV 20 may transmit a second message (R2) indicative of the OA1 result to the ABV 30, which may provide the AS to the GBO 10 based thereon.

Figure 8:
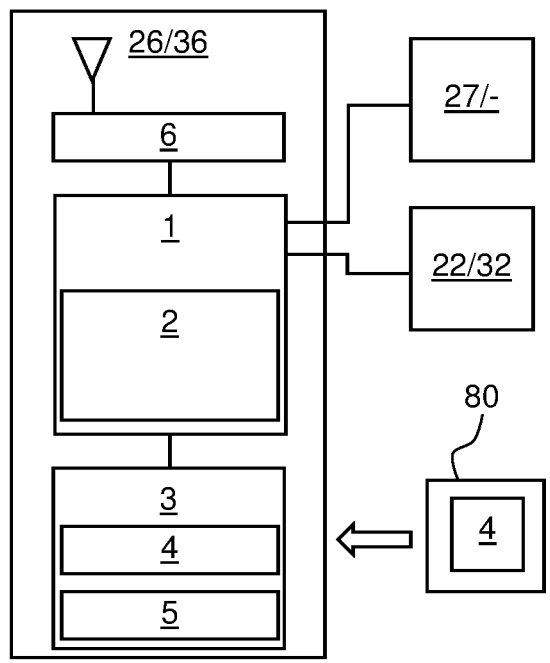
FIG. 8 is a block diagram of a local control device for a vehicle.

FIG. 8 is a block diagram of an exemplifying structure of a local control device (LCD) 26, 36 on the respective GBV 20 and ABV 30. Generally, the LCD 26, 36 may be configured to perform any of the methods described herein, or part thereof, by a combination of software and hardware circuitry, or exclusively by specific hardware circuitry. In FIG. 8, the LCD comprises a control circuit 1 responsible for the overall operation of the LCD. As shown, the control circuit 1 may include a processing device or processor 2, which may be or include a central processing unit (CPU), graphics processing unit (GPU), microcontroller, microprocessor, ASIC, FPGA, or any other specific or general processing device. The processor 2 may execute instructions 4 stored in a separate memory, such as memory 3, and/or in an internal memory (not shown) of the control circuit 1, in order to control the operation of the LCD. The instructions 4 when executed by the processor 2 may cause the LCD to perform any of the methods described herein, or part thereof. As indicated in FIG. 8, the memory 3 may also store data 5 for use by the processor 2, for example relative location data, a transformation matrix, the temporal and spatial limits, an extent of the respective GBO/GBV, etc. The memory 3 may comprise one or more of a buffer, a flash memory, a hard drive, a removable media, a volatile memory, a non-volatile memory, a random access memory (RAM), or another suitable device. In an exemplary arrangement, the memory 3 includes a non-volatile memory for long term data storage and a volatile memory that functions as system memory for the control circuit 1. The memory 3 may exchange data with the control circuit 1 over a data bus. Accompanying control lines and an address bus between the memory 3 and the control circuit 1 may also be present. The memory 3 is considered a non-transitory computer readable medium. The LCD 26, 36 may further include a communication device 6 for wireless communication, for example with one or more other LCDs or an external control device (cf. 50 in FIG. 7A). The communication device 6 may comprise at least one radio transceiver, at least one antenna, tuners, impedance matching circuits, and any other components needed for wireless communication. In a variant, the communication device 6 is separate from the LCD.

It may be noted that some functions of the described methods may be implemented in hardware, which may be invoked by the executing instructions 4 to produce a specific type of output from a specific type of input. The instructions 4 may be supplied to the LCD on a computer-readable medium 80, which may be a tangible (non-transitory) product (for example magnetic medium, optical disk, read-only memory, flash memory, etc.) or a propagating signal.

In the example of FIG. 8, the LCD 26, 36 is connected to a vision sensor 22, 32 and arranged to control the operation of the vision sensor 22, 32. Further, in a GBV 20, the LCD 26 may be connected to a feedback device 27 (cf. FIG. 2A).

FIG. 8 may also be seen to exemplify the structure of the external control device 50 in FIG. 7A, which however lacks vision sensor and feedback device.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results. In certain circumstances, parallel processing may be advantageous.

In the following, items are recited to summarize some aspects and embodiments as disclosed in the foregoing.

Item 1: A method of mitigating traffic risks among a group of vehicles comprising an air-based vehicle (30) and a ground-based vehicle (20), the air-based vehicle (30) being operated to track a ground-based object (10), said method comprising, at a current time point:
obtaining (301) predicted navigation data for the ground-based vehicle (20) and the air-based vehicle (30),
processing (302) the predicted navigation data to obtain one or more future locations of the ground based-object (10) and to detect an upcoming spatial proximity between the ground-based object (10) and the ground-based vehicle (20), and
causing (305), upon detection of the upcoming spatial proximity, an alert signal (AS) to be provided to at least one of the ground-based object (10) and the ground-based vehicle (20).

Item 2: The method of item 1, wherein the predicted navigation data is indicative of a first predicted trajectory (T20) for the ground-based vehicle (20), and a second predicted trajectory (T10) for the ground-based object (10) that is tracked by the air-based vehicle (30).

Item 3: The method of item 2, wherein the predicted navigation data comprises a predicted trajectory for the air-based vehicle (30), said processing (302) comprising: determining (311) location data of the ground-based object (10) in relation to the air-based vehicle (30), and converting (312) the predicted trajectory for the air-based vehicle (30) into the second predicted trajectory (T10) for the ground-based object (10) based on the location data.

Item 4: The method of item 2 or 3, wherein the first predicted trajectory (T20) comprises a sequence of first locations and associated first time points in relation to a reference time point, and wherein the second predicted trajectory (T10) comprises a sequence of second locations and associated second time points in relation to the reference time point.

Item 5. The method of item 4, wherein said processing (302) comprises: mapping (313) the first locations and the associated first time points of the first predicted trajectory (T20) to the second locations and the associated second time points of the second predicted trajectory (T10), and detecting (314) the upcoming spatial proximity based on the mapping.

Item 6. The method of item 5, wherein the upcoming spatial proximity is detected when a distance (D3, D4, D5) between a first location and a second location is below a spatial limit and when a time difference between a first time point associated with the first location and a second time point associated with the second location is below a temporal limit.

Item 7: The method of item 5 or 6, wherein at least one of the spatial and temporal limits are set as a function of a velocity vector of the ground-based vehicle (20) and/or a velocity vector of the ground-based object (10).

Item 8: The method of any preceding item, further comprising: analysing (304), upon the detection of the upcoming spatial proximity, the predicted navigation data and/or sensor data for determination of an occluded line-of-sight (LOS) between the ground-based object (10) and the ground-based vehicle (20), wherein said sensor data is obtained by a vision sensor (22; 12; 32) on at least one of the ground-based vehicle (20), the ground-based object (10) and the air-based vehicle (30).

Item 9: The method of item 8, wherein the group of vehicles comprises at least one further ground-based vehicle (20'), wherein said analysing (304) comprises: determining (332) an LOS between the ground-based vehicle (20) and the ground-based object (10) at one or more time points, mapping (333) a location of the at least one further ground-based vehicle (20') to the LOS (L1, L2, L3) at said one or more time points, and detecting (334) the occluded LOS when the at least one further ground-based vehicle (20') blocks the LOS (L1, L2, L3) at at least one of said one or more time points.

Item 10: The method of item 9, wherein said one or more time points are future in relation to the current time point.

Item 11: The method of item 9 or 10, wherein said determining (332) the LOS comprises: determining an LOS vector (LOSV1) between the air-based vehicle (30) and the ground based-vehicle (20), obtaining a location vector (LV) between the air-based vehicle (30) and the ground based-object (10), and computing the LOS between the ground-based object (10) and the ground-based vehicle (20) as a function of the LOS vector (LOSV1) and location vector (LV).

Item 12: The method of any one of items 8-11, wherein said analysing (304) comprises: determining (321) a predicted location of the ground-based object (10) or the ground-based vehicle (20), and operating (322) the vision sensor (22; 12; 32) of the ground-based vehicle (20), the ground-based object (10) or the air-based vehicle (30) to capture the sensor data with the predicted location positioned within a field of view (24; 34) of the vision sensor (22; 12; 32).

Item 13: The method of item 12, wherein said analysing (304) further comprises: processing (323) the sensor data for detection of an occluding object (40) between a reference point and the predicted location, the reference point being located on the ground-based vehicle (20) or on the ground-based object (10), respectively.

Item 14: The method of item 12 or 13, wherein said determining (321) the predicted location and said operating (322) the vision sensor (22; 12; 32) are performed at or subsequent to the current time point.

Item 15: The method of any preceding item, wherein the alert signal (AS) is provided to the ground-based object (10) via the air-based vehicle (30).

Item 16: The method of any preceding item, further comprising: determining the group of vehicles among a larger plurality of vehicles by clustering based on respective locations of the larger plurality of vehicles at one or more time points.

Item 17. A computer-readable medium comprising computer instructions (4) which, when executed by a processor (2), cause the processor (2) to perform the method of any one of items 1-16.

Item 18: A monitoring system for mitigating traffic risks among a group of vehicles comprising an air-based vehicle (30) and a ground-based vehicle (20), the air-based vehicle (30) being operable to track a ground-based object (10), said monitoring system being configured to, at a current time point:
obtain predicted navigation data for the ground-based vehicle (20) and the air-based vehicle (30),
process the predicted navigation data to determine one or more future locations of the ground based-object (10) and to detect an upcoming spatial proximity between the ground-based object (10) and the ground-based vehicle (20), and
cause, upon detection of the upcoming spatial proximity, an alert signal (AS) to be provided to at least one of the ground-based object (10) and the ground-based vehicle (20).

Item 19: The monitoring system of item 18, which is located on one vehicle in the group of vehicles and configured to communicate wirelessly with a respective local control device (26, 36) on other vehicles in the group of vehicles.

Item 20: The monitoring system of item 18, which is separate from the group of vehicles and configured to communicate wirelessly with local control devices (26, 36) on vehicles in the group of vehicles.

Item 21: A vehicle comprising a monitoring system in accordance with any one of items 18-20.

The invention claimed is:

1. A method of mitigating traffic risks among a group of vehicles comprising an air-based vehicle being operated to track a ground-based object, and a ground-based vehicle, the method comprising:
storing predicted navigation data of the ground-based vehicle and the air-based vehicle in a non-volatile memory device of a control device, wherein the predicted navigation data is indicative of a predicted trajectory of the ground-based vehicle and a predicted trajectory of the air-based vehicle, wherein the control device comprises:
a processing device;
the memory device; and
computer instructions stored in the memory device that, when executed by the processor device, cause the processor device to perform the method of mitigating traffic risks;
processing the predicted navigation data by the processing device executing the computer instructions to:
determine relative location data that defines a relative location between the ground-based object and the air-based vehicle;
determine a predicted trajectory of the ground-based object based on the relative location data and the predicted trajectory of the air-based vehicle;
determine a future location of the ground-based object based on the predicted trajectory of the ground-based object;
determine a future location of the ground-based vehicle based on the predicted trajectory of the ground-based vehicle; and
detect an upcoming spatial proximity between the ground-based object and the ground-based vehicle based on the determined future locations of the ground-based object and the ground-based vehicle;
transmitting an alert signal to at least one of the ground-based object and/or the ground-based vehicle based on detecting the upcoming spatial proximity between the ground-based object and the ground-based vehicle;
determining predicted navigation data of at least one further vehicle of the group of vehicles;
based on analyzing the predicted navigation data of the ground-based vehicle and the air-based vehicle, determining a line-of-sight (LOS) between the ground-based vehicle and the ground-based object at one or more time points;
based on the predicted navigation data of at least one further vehicle, mapping locations of the at least one further vehicle to the LOS between the ground-based vehicle and the ground-based object at the one or more time points;
detecting an occluded LOS between the ground-based vehicle and the ground-based object for the at least one further vehicle being disposed in the LOS at any one or more of the one or more time points; and
indicating the occluded LOS to at least one of the ground-based object and/or the ground-based vehicle.

2. The method of claim 1, wherein:
the predicted trajectory of the ground-based vehicle comprises a sequence of first locations and associated first time points in relation to a reference time point; and
the predicted trajectory of the ground-based object comprises a sequence of second locations and associated second time points in relation to the reference time point.

3. The method of claim 2, wherein said processing comprises:
mapping the first locations and the associated first time points of the first predicted trajectory of the ground-based vehicle to the second locations and the associated second time points of the predicted trajectory of the ground-based object; and
detecting the upcoming spatial proximity based on the mapping.

4. The method of claim 3, wherein the upcoming spatial proximity is detected when a distance between a first location and a second location is below a spatial limit and when a time difference between a first time point associated with the first location and a second time point associated with the second location is below a temporal limit.

5. The method of claim 3, wherein at least one of the spatial and temporal limits are set as a function of a velocity vector of the ground-based vehicle and/or a velocity vector of the ground-based object.

6. The method of claim 1, further comprising:
analyzing, upon the detection of the upcoming spatial proximity, sensor data for determination of a further occluded line-of-sight between the ground-based object and the ground-based vehicle,
wherein said sensor data is obtained by a vision sensor on at least one of the ground-based vehicle, the ground-based object and/or the air-based vehicle.

7. The method of claim 1, wherein said one or more time points are future in relation to a current time point.

8. The method of claim 1, wherein said determining the LOS comprises:
determining a LOS vector between the air-based vehicle and the ground-based vehicle, obtaining a location vector between the air-based vehicle and the ground-based object, and computing the LOS between the ground-based object and the ground-based vehicle as a function of the LOS vector and location vector.

9. The method of claim 6, wherein said analyzing comprises:
determining a predicted location of the ground-based object or the ground-based vehicle, and operating the vision sensor of the ground-based vehicle, the ground-based object or the air-based vehicle to capture the sensor data with the predicted location positioned within a field of view of the vision sensor.

10. The method of claim 9, wherein said analyzing further comprises:
processing the sensor data for detection of an occluding object between a reference point and the predicted location, the reference point being located on the ground-based vehicle or on the ground-based object, respectively.

11. The method of claim 9, wherein said determining the predicted location and said operating the vision sensor are performed at or subsequent to a current time point.

12. The method of claim 1, wherein the alert signal is provided to the ground-based object via the air-based vehicle.

13. The method of claim 1, further comprising:
determining the group of vehicles among a larger plurality of vehicles by clustering based on respective locations of the larger plurality of vehicles at one or more time points.

14. A non-transitory computer-readable medium comprising computer instructions stored thereon that, when executed by a processor, cause the processor to perform a method comprising:
storing predicted navigation data of a ground-based vehicle and an air-based vehicle in the computer-readable medium, wherein the predicted navigation data is indicative of a predicted trajectory of the ground-based vehicle and a predicted trajectory of the air-based vehicle;
determining relative location data that defines a relative location between the ground-based object and the air-based vehicle;
determine a predicted trajectory of the ground-based object on the relative location data and the predicted trajectory of the air-based vehicle;
determine a future location of the ground-based object based on the predicted trajectory of the ground-based object;
determine a future location of the ground-based vehicle based on the predicted trajectory of the ground-based vehicle;
detecting an upcoming spatial proximity between the ground-based object and the ground-based vehicle based on the determined future locations of the ground-based object and the ground-based vehicle;
transmitting an alert signal to at least one of the ground-based object and/or the ground-based vehicle based on detecting the upcoming spatial proximity between the ground-based object and the ground-based vehicle;
determining predicted navigation data of at least one further vehicle of the group of vehicles;
based on analyzing the predicted navigation data of the ground-based vehicle and the air-based vehicle, determining a line-of-sight (LOS) between the ground-based vehicle and the ground-based object at one or more time points;
based on the predicted navigation data of at least one further vehicle, mapping locations of the at least one further vehicle to the LOS between the ground-based vehicle and the ground-based object at the one or more time points;
detecting an occluded LOS between the ground-based vehicle and the ground-based object for the at least one further vehicle being disposed in the LOS at any one or more of the one or more time points; and
indicating the occluded LOS to at least one of the ground-based object and/or the ground-based vehicle.

15. A monitoring system for mitigating traffic risks among a group of vehicles comprising an air-based vehicle being operable to track a ground-based object, and a ground-based vehicle, the monitoring system comprising:
a control device comprising:
a processing device;
a non-volatile memory device; and
computer instructions stored in the memory device that, when executed by the processor device, cause the processor device to:
store predicted navigation data of the ground-based vehicle and the air-based vehicle in the computer-readable medium, wherein the predicted navigation data is indicative of a predicted trajectory of the ground-based vehicle and a predicted trajectory of the air-based vehicle;
process the predicted navigation data to:
determine relative location data that defines a relative location between the ground-based object and to the air-based vehicle;
determine a predicted trajectory of the ground-based object based on the relative location data and the predicted trajectory of the air-based vehicle;
determine a future location of the ground-based object based on the predicted trajectory of the ground-based object;
determine a future location of the ground-based vehicle based on the predicted trajectory of the ground-based vehicle;
detect an upcoming spatial proximity between the ground-based object and the ground-based vehicle based on the determined future locations of the ground-based object and the ground-based vehicle;
transmit an alert signal to at least one of the ground-based object and/or the ground-based vehicle based on detecting the upcoming spatial proximity between the ground-based object and the ground-based vehicle;
determine predicted navigation data of at least one further vehicle of the group of vehicles;
based on analyzing the predicted navigation data of the ground-based vehicle and the air-based vehicle, determine a line-of-sight (LOS) between the ground-based vehicle and the ground-based object at one or more time points;
based on the predicted navigation data of at least one further vehicle, map locations of the at least one further vehicle to the LOS between the ground-based vehicle and the ground-based object at the one or more time points;
detect an occluded LOS between the ground-based vehicle and the ground-based object for the at least one further vehicle being disposed in the LOS at any one or more of the one or more time points; and indicate the occluded LOS to at least one of the ground-based object and/or the ground-based vehicle.

16. The monitoring system of claim 15, wherein:
the control device is configured to be disposed in a first vehicle of the group of vehicles and configured to communicate wirelessly with a respective local control device disposed in a vehicle of the group of vehicles other than the first vehicle.

17. The monitoring system of claim 15, wherein the control device:
is configured to be disposed separately from the group of vehicles; and
is configured to communicate wirelessly with one or more local control devices disposed in vehicles of the group of vehicles.

* * * * *